United States Patent
Schoener et al.

(10) Patent No.: US 11,814,466 B2
(45) Date of Patent: Nov. 14, 2023

(54) HYDROPHILIC POLYURETHANE FOAM FOR WATER

(71) Applicant: Dow Global Technologies LLC, Midland, MI (US)

(72) Inventors: Cody Schoener, Lake Jackson, TX (US); Yasmin N. Srivastava, Sugarland, TX (US)

(73) Assignee: Dow Global Technologies LLC, Midland, MI (US)

( * ) Notice: Subject to any disclaimer, the term of this patent is extended or adjusted under 35 U.S.C. 154(b) by 187 days.

(21) Appl. No.: 17/277,505

(22) PCT Filed: Sep. 17, 2019

(86) PCT No.: PCT/US2019/051573
§ 371 (c)(1),
(2) Date: Mar. 18, 2021

(87) PCT Pub. No.: WO2020/068495
PCT Pub. Date: Apr. 2, 2020

(65) Prior Publication Data
US 2022/0033564 A1    Feb. 3, 2022

Related U.S. Application Data

(60) Provisional application No. 62/738,203, filed on Sep. 28, 2018.

(51) Int. Cl.
| | | |
|---|---|---|
| *C08G 18/08* | (2006.01) | |
| *C08G 18/12* | (2006.01) | |
| *C08G 18/18* | (2006.01) | |
| *C08G 18/06* | (2006.01) | |
| *E03F 5/10* | (2006.01) | |
| *C08G 18/48* | (2006.01) | |
| *C08G 101/00* | (2006.01) | |

(52) U.S. Cl.
CPC ............ *C08G 18/14* (2013.01); *C08G 18/12* (2013.01); *C08G 18/485* (2013.01); *C08G 2101/00* (2013.01); *C08G 2110/0008* (2021.01); *C08G 2110/0058* (2021.01); *C08G 2110/0075* (2021.01); *C08G 2110/0083* (2021.01)

(58) Field of Classification Search
None
See application file for complete search history.

(56) References Cited

U.S. PATENT DOCUMENTS

| | | | |
|---|---|---|---|
| 4,365,025 A | 12/1982 | Murch | |
| 8,809,410 B2 | 8/2014 | Macken | |
| 9,814,187 B2 | 11/2017 | Macken | |
| 11,485,816 B2* | 11/2022 | Srivastava | .......... C08G 18/4837 |
| 2006/0142539 A1 | 6/2006 | Thiede | |
| 2016/0115387 A1 | 4/2016 | Vandevelde | |
| 2017/0260316 A1* | 9/2017 | Srivastava | .......... C08G 18/485 |
| 2017/0267291 A1* | 9/2017 | Granen Roca | ......... B62D 25/07 |

FOREIGN PATENT DOCUMENTS

| | | | |
|---|---|---|---|
| EP | 0875637 A2 * | 11/1998 | |
| EP | 2344560 A | 7/2011 | |
| WO | 2011/042284 A | 4/2011 | |
| WO | 2016/069437 A | 5/2016 | |

OTHER PUBLICATIONS

Machine translation of EP-0875637-A2 obtained from the European Patent Office in Dec. 2022.*

* cited by examiner

*Primary Examiner* — Melissa A Rioja

(57) ABSTRACT

Hydrophilic polyurethane foam is made from a diphenylmethane-based quasi-prepolymer having specified isocyanate and oxyethylene contents. The foams have an unusually good capacity for retaining water even when under compressive forces. They also exhibit at most moderate swelling when saturated with water. The foam is useful as a layer of a water containment system such as a green roof or blue roof system.

11 Claims, 1 Drawing Sheet

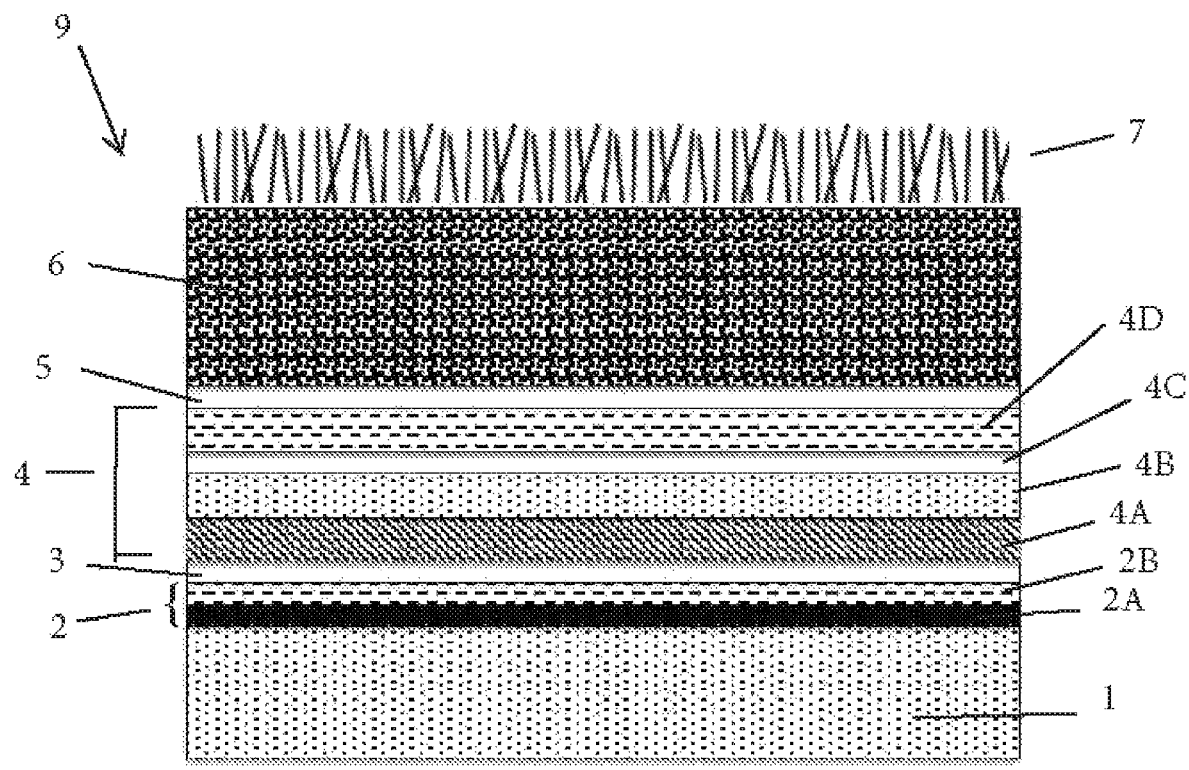

HYDROPHILIC POLYURETHANE FOAM FOR WATER

This invention relates to a hydrophilic foam, a method for making the hydrophilic foam and water management systems that contain a hydrophilic foam component.

Precipitation that collects on the roofs of buildings or other structures, or on other large horizontal surfaces such as roadways and parking structures, is frequently discharged into local sewer systems. This can put a strain on the sewer system or even overwhelm its capacity, particularly when there is a heavy rainfall or rapid melting of snow or ice. This can result in flooding, discharge of untreated runoff and other problems.

In response to these problems, it has been proposed to capture some or all of this water so the water either is not sent into the sewer system at all or else can be discharged more gradually, over a prolonged period of time.

Accordingly, so-called "blue" and "green" roofing structures are being developed. "Blue" roofing structures include ponding mechanisms, which capture and hold the water, allowing it to be released at a controlled rate over time. "Green" roofing structures capture the water and provide at least some of it to a vegetation layer in which living plants are cultivated. The vegetation uses the water in metabolic processes and in addition dissipates water back to the atmosphere through transpiration. Both blue and green roofing systems also usually include mechanisms for controlled discharge of water in excess of what the vegetation can use or in excess of the storage capacity of the system.

The captured water is often immobilized; having large quantities of standing water on the top of a building structure is normally not wanted. Furthermore, the upper surface of the roof structure should be weight-bearing to tolerate foot traffic (for repairs and maintenance, for example), the weight of building mechanicals such as HVAC, power and other systems, recreational decks, supporting structure and equipment and, in the case of green roofs, the weight of the soil, its containers and the vegetation.

Hydrophilic foams have been proposed for use in immobilizing captured water. These foams act as "sponges" to absorb and hold the water. In a blue roofing system, the hydrophilic foam forms a continuous or discontinuous layer in all or part of the roofing structure. Because the foams are soft and compressible, it is common to construct a hard, weight-bearing layer directly or indirectly on top of the hydrophilic foam, so the roof structure can bear weight without damaging the foam layer. In green roofing systems, the hydrophilic foam layer is again typically located beneath other roofing structures that may include such a weight-bearing layer as well as the upper vegetation layer.

When the hydrophilic foam layer is buried, it must bear the weight of the overlying structures. Therefore, the foam is often in some state of compression. Like many spongy materials, hydrophilic foams that have been proposed for use as such a hydrophilic foam layer tend to release water when placed under a compressive force. This reduces its water-holding capacity.

What is desired is a hydrophilic polyurethane foam and a construction layer material that exhibits a high water-holding capacity and retains a large proportion of that water-holding capacity even when under a compressive force. It is further desired to provide a multilayer structure that is capable of absorbing water in one or more of its layers and holding that absorbed water even while such layer is under compression, and to provide a water management system that includes such a multilayer structure.

This invention in one aspect is a hydrophilic polyurethane foam which is the reaction product of a reaction mixture that comprises:
  a) water,
  b) a quasi-prepolymer, which quasi-prepolymer has an isocyanate content of 5 to 15% by weight and contains 55 to 75 weight percent of oxyethylene units based on the weight of the quasi-prepolymer, which quasi-prepolymer is a reaction product of i) a hydroxyl-terminated polymer of ethylene oxide or mixture of two or more thereof, wherein the hydroxyl-terminated polymer of ethylene oxide or mixture thereof has an average oxyethylene content of at least 90%, based on the weight of the hydroxyl-terminated polymer of ethylene oxide or mixture thereof, has a number average nominal hydroxyl functionality of 2 to 2.5 and has a number average hydroxyl equivalent weight of at least 350, with ii) an excess of an organic polyisocyanate that includes at least 80 weight-% diphenylmethane diisocyanate of which diphenylmethane diisocyanate at least 60 weight-% is 4,4'-diphenylmethane diisocyanate, wherein component b) is present in an amount sufficient to provide an isocyanate index of 0.5 to 50; and
  c) one or more surfactants.

The invention is in a second aspect a method of making a hydrophilic polyurethane foam, comprising:
  A. forming a reaction mixture that comprises:
    a) water,
    b) a quasi-prepolymer, which quasi-prepolymer has an isocyanate content of 5 to 15% by weight and contains 55 to 75 weight percent of oxyethylene units based on the weight of the quasi-prepolymer, which quasi-prepolymer is a reaction product of i) a hydroxyl-terminated polymer of ethylene oxide or mixture of two or more thereof, wherein the hydroxyl-terminated polymer of ethylene oxide or mixture thereof has an average oxyethylene content of at least 90%, based on the weight of the one or more hydroxyl-terminated polymer of ethylene oxide or mixture thereof and has a number average hydroxyl equivalent weight of at least 350, with ii) an excess of an organic polyisocyanate that includes at least 80 weight-% diphenylmethane diisocyanate of which diphenylmethane diisocyanate at least 60 weight-% is 4,4'-diphenylmethane diisocyanate, wherein component b) is present in an amount sufficient to provide an isocyanate index of 0.5 to 50; and
    c) one or more surfactants; and
  B. curing the reaction mixture formed in step A.

The invention is in a third aspect a quasi-prepolymer having an isocyanate content of 5 to 15% by weight and containing 55 to 75 weight percent of oxyethylene units based on the weight of the quasi-prepolymer, which quasi-prepolymer is a reaction product of i) a hydroxyl-terminated polymer of ethylene oxide or mixture of two or more thereof wherein the hydroxyl-terminated polymer of ethylene oxide or mixture thereof has an average oxyethylene content of at least 90%, based on the weight of the one or more hydroxyl-terminated polymer of ethylene oxide or mixture thereof and has a number average hydroxyl equivalent weight of at least 350, with ii) an excess of an organic polyisocyanate that includes at least 80 weight-% diphenylmethane diisocyanate of which diphenylmethane diisocyanate at least 60 weight-% is 4,4'-diphenylmethane diisocyanate.

The invention is also a single- or multilayer mat, wherein the mat includes at least one layer of a hydrophilic polyurethane foam of the first aspect of the invention, and/or made in accordance with the second aspect of the invention.

The invention is also a water containment system comprising a hydrophilic polyurethane foam of the invention. The water containment system may be, for example, a blue roof, a green roof, a blue-green roof, or a system for capturing and containing rainwater falling upon and/or running off of other structures such as a parking lot, a parking garage, a tarmac, a roadway, a bridge, and the like.

In particular aspects, the water containment system of the invention comprises at least one water barrier layer, at least one layer of the hydrophilic polyurethane foam of the invention directly or indirectly on top of at least a portion of the water barrier layer, and at least one top surface layer positioned directly or indirectly on top of at least a portion of the hydrophilic polyurethane foam layer, the water containment system comprising means for draining water deposited upon the top surface layer to the hydrophilic foam layer.

The FIGURE a cross-sectional view of an embodiment of a water containment of the invention.

The quasi-prepolymer is a reaction product of an organic polyisocyanate that includes diphenylmethane diisocyanate (MDI), and one or more polymers of ethylene oxide. The organic polyisocyanates (other than MDI which has an isocyanate equivalent weight of approximately 125), when present, may have an isocyanate equivalent weight of, for example, up to 300 or up to 200.

By "quasi-prepolymer", it is meant that the reaction product is a mixture of free (unreacted) organic polyisocyanate and isocyanate-terminated prepolymer molecules formed in the reaction of the polyether and organic polyisocyanate molecules. The amount of free organic polyisocyanate may constitute, for example, at least 5 percent, at least 10 percent, at least 15 percent or at least 20 percent of the total weight of the prepolymer, to as much as 50 percent, as much as 35 percent, as much as 30 percent or as much as 25 percent thereof.

MDI constitutes at least 80% of the weight of the organic polyisocyanate. It may constitute at least 85%, at least 90% or at least 95% thereof, and may constitute up to 100% or up to 99% thereof. The MDI contains 4,4'-diphenylmethane diisocyanate (4,4'-MDI) or a mixture of thereof with 2,4'-diphenylmethane diisocyanate (2,4'-MDI). At least 60%, at least 70%, at least 75% or at least 80% of the weight of the MDI may be the 4,4'-isomer. The 4,4'-isomer may constitute up to 100%, up to 99% or up to 98% of the weight of the MDI.

In some embodiments, the organic polyisocyanate may have a number average isocyanate functionality of 1.95 to 2.15, preferably 1.95 to 2.05, and an isocyanate equivalent weight of 123 to 128, preferably 124 to 126.

The organic polyisocyanate may contain up to 20 weight-%, preferably up to 10 weight-%, up to 5 weight-% or up to 2 weight-%, of other isocyanate-containing compounds although any or all of those other compounds may be absent. Examples of other isocyanate-containing compounds include 2,2'-diphenylmethane diisocyanate (which is often present at very small levels in commercially available MDI products), polyphenylene polymethylene polyisocyanates having three or more rings, toluene diisocyanate, one or more aliphatic polyisocyanates, and the like, as well as isocyanate-containing compounds that contain, for example, any one or more of biuret, allophonate, urea, urethane, isocyanurate and/or carbodiimide linkages.

The organic polyisocyanate may contain at least 60 weight-%, at least 70 weight-% or at least 80 weight-% of 4,4'-diphenylmethane diisocyanate.

The most preferred organic polyisocyanate is an MDI product that contains at least 60 weight-%, at least 70 weight-% or at least 80 weight-% 4,4'-MDI, up to 40 weight-%, preferably up to 30 weight-% or up to 20 weight-% 2,4'-MDI and 0 to 2 weight percent of other isocyanate compounds.

The hydroxyl-terminated polymer of ethylene oxide is a homopolymer of ethylene oxide or a hydroxyl-terminated random or block copolymer of ethylene oxide and one or more other alkylene oxides, particularly 1,2-propylene oxide. The hydroxyl-terminated polymer of ethylene oxide or mixture thereof has an average oxyethylene content of at least 90% based on the weight of the one or more hydroxyl-terminated prepolymers, has a number average nominal hydroxyl functionality of 2 to 2.5 and has a number average hydroxyl equivalent weight of at least 350. When two or more polymers of ethylene oxide are present, these oxyethylene content, functionality and equivalent weight values apply to the mixture as a whole rather than to the individual ethylene oxide polymers contained within the mixture. When a mixture of polymers of ethylene oxide is present, individual components of the mixture may have functionalities and equivalent weights within or outside these values, provided that the mixture has the aforementioned values of oxyethylene oxide, functionality and equivalent weight.

The oxyethylene oxide content of an ethylene oxide polymer or mixture is 100% times the weight ratio of oxyethylene ($-O-CH_2-CH_2-$) units in the polymer or mixture to the total weight of the polymer or mixture. The oxyethylene content of the ethylene oxide polymer or mixture may be, for example, at least 92% or at least 94% by weight and may be up to 100%, up to 99%, up to 98% or up to 97%.

The number average hydroxyl equivalent weight of the ethylene oxide polymer or mixture may be, for example, at least 400 or at least 450 and in some embodiments may be up to 2000, up to 1500, up to 1200, up to 1000 or up to 750. Equivalent weight is determined by measuring the hydroxyl number in mg KOH/g of polymer using well-known titration numbers and calculating the equivalent weight from the hydroxyl number according to the relationship equivalent weight=56,100÷hydroxyl number. The average nominal hydroxyl functionality may be at least 2.0 or at least 2.1 and may be, for example, up to 2.4 or up to 2.3.

It is preferred to include an ethylene oxide homopolymer as the ethylene oxide polymer or as a component of the mixture of ethylene oxide polymers. Such an ethylene oxide homopolymer may have a hydroxyl equivalent weight of, for example, at least 350, at least 400 or at least 450 and, for example, up to 2000, up to 1500 up to 1200, up to 1000 or up to 750. It may have a nominal hydroxyl functionality of 2 to 4, especially 2 to 3 and, if used as the sole ethylene oxide polymer, 2. When used as a component of a mixture of ethylene oxide polymers, such a homopolymer may constitute, for example, at least 30 weight-%, at least 40 weight-%, at least 50 weight-%, at least 60 weight-%, or at least 70 weight-% of the mixture. Such an ethylene oxide homopolymer may be a room temperature solid.

A copolymer of ethylene oxide and one or more other alkylene oxides (especially 1,2-propylene oxide) is a useful ethylene oxide polymer, provided it or a mixture containing it has the ethylene oxide content, hydroxyl equivalent weight and hydroxyl functionality specified above. Any such copolymer preferably contains at least 50% by weight oxyethylene groups based on the total weight of the copolymer. A copolymer of particular interest is a random or block copolymer of ethylene oxide and 1,2-propylene oxide which contains 50 to 95 weight-%, preferably 60 to 95 weight-%, of oxyethylene groups and correspondingly 5 to 50 weight-%, preferably 5 to 40 weight-%, of 2-methyloxypropylene groups.

A branching agent and/or chain extender is optionally present when the quasi-prepolymer is formed. Such a branching agent or chain extender may have a hydroxyl equivalent weight of up to 250 or up to 125, and may have at least 3 hydroxyl groups per molecule in the case of a branching agent and exactly two hydroxyl groups per molecule in the case of a chain extender. If these are present at all, they are suitably present in an amount of up to 5, preferably up to 2, parts by weight per 100 parts by weight of the ethylene oxide polymer or mixture thereof.

One or more other isocyanate-reactive materials may be present in the reaction mixture that produces the quasi-prepolymer, but if present at are preferably are present in small amounts, such as up to 5, preferably up to 2, parts by weight per 100 parts by weight of the ethylene oxide polymer or mixture thereof.

In some embodiments, the quasi-prepolymer is a reaction product of only the polyisocyanate(s), the ethylene oxide polymer(s) and one or more branching agents and/or chain extenders. In other embodiments, the quasi-prepolymer is a reaction product of only the polyisocyanate(s) and ethylene oxide polymer(s). In each such case, the ethylene oxide polymer is most preferably a homopolymer of ethylene oxide as described above, or a mixture of ethylene oxide polymers consisting of one or more ethylene oxide homopolymers as described above and one or more random or block copolymers of ethylene oxide and another alkylene oxide, especially 1,2-propylene oxide) as described before.

The equivalent weight and oxyethylene content of the polyether(s) (and optional isocyanate-reactive materials such as branching agents and chain extenders) are selected together with the amount and equivalent weight of the organic polyisocyanate to produce, after reaction, a quasi-prepolymer having an isocyanate content of 5 to 15% by weight of the quasi-prepolymer and an oxyethylene content of 55% to 75% by weight of the quasi-prepolymer. The isocyanate content may be at least 6% or at least 6.5% and may be, for example, up to 12%, up to 10% or up to 9%.

The isocyanate content of the quasi-prepolymer may be determined using well-known titration methods.

The oxyethylene content of the quasi-prepolymer is conveniently calculated from the oxyethylene content of the ethylene oxide polymer(s) and the weights of the reactive starting materials, i.e., the weights of the ethylene oxide polymer(s) and organic polyisocyanate used in making the quasi-prepolymer, as well as the weights of any branching agents, chain extenders and/or other isocyanate-reactive materials as may be used.

The quasi-prepolymer is conveniently prepared by mixing the organic polyisocyanate and isocyanate-reactive materials as described above and subjecting the resulting reaction mixture to conditions under which the isocyanate groups and hydroxyl groups react to form urethane linkages. This reaction is conveniently performed at an elevated temperature (such as from 60 to 180° C.) and preferably under an inert atmosphere such as nitrogen, helium or argon. The reaction is generally continued until the product attains a target or constant isocyanate content, indicating the consumption of essentially all the hydroxyl groups of the starting materials.

The reaction that forms the quasi-prepolymer may be performed in the presence of a urethane catalyst, i.e. a catalyst for the reaction of an isocyanate group with water, and/or with a hydroxyl group to form a urethane group, as described below.

Alternatively, the quasi-prepolymer may be made in the substantial absence of a urethane catalyst. In such embodiments, the reaction mixture preferably contains no more than 1 part per million by weight of metals and no more than 100 parts per million of amine compounds. The resulting quasi-prepolymer accordingly contains similarly small amounts of such materials (if any at all). In such embodiments, the ethylene oxide polymer(s) preferably are not amine-initiated and do not otherwise contain amine groups that exhibit activity as urethane catalysts.

Foam is made by reacting the quasi-prepolymer with water in the presence of a foam-stabilizing surfactant.

The foam-stabilizing surfactant helps stabilize gas bubbles formed during the foaming process until the polymer has cured. A wide variety of silicone surfactants as are commonly used in making polyurethane foams can be used in making foams of this invention. Surfactants that are self-dispersible or soluble in water are preferred. Examples of such silicone surfactants are commercially available under the trade names Tegostab™ (Th. Goldschmidt and Co.), Niax™ (GE OSi Silicones) and Dabco™ (Air Products and Chemicals). Other useful surfactants include block copolymers of ethylene oxide and propylene oxide and/or butylene oxide wherein the poly(ethylene oxide) block or blocks constitute 35 to 75% of the total weight of the block copolymer. Such block copolymers may have one or more hydroxyl groups. The surfactant(s) may be present in an amount of 0.25 to 5 or 0.5 to 2.5 parts by weight per 100 parts by weight of the polyol mixture.

The foam-forming reaction mixture may contain various other ingredients. Such other ingredients may include, for example, one or more isocyanate-reactive materials such as polyols, polyamines and aminoalcohols. Examples of such isocyanate reactive materials include chain extenders, crosslinkers, polyether polyols, amine-terminated polyethers, polyester polyols and the like. If such additional isocyanate-reactive materials are present, they preferably are present in minor amounts, such as up to 25%, preferably up to 10% of the total combined weight of the water and additional isocyanate-reactive materials. The additional isocyanate-reactive materials may be absent.

The foam-forming reaction mixture may contain a urethane catalyst. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N, N-dimethylethanolamine, N, N, N',N'-tetramethyl-1,4-butanediamine, N, N-dimethylpiperazine, 1,4-diazobicyclo-2,2,2-octane, bis (dimethylaminoethyl)ether, triethylenediamine and dimethylalkylamines where the alkyl group contains 4 to 18 carbon atoms. Mixtures of these tertiary amine catalysts are often used.

A reactive amine catalyst such as DMEA (dimethylethanolamine) or DMAPA (dimethylaminopropyl amine), or an amine-initiated polyol, acting as an autocatalytic polyol, may also be used.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 4, and the like. Zinc and tin catalysts are generally used in conjunction with one or more tertiary amine catalysts, if used at all.

Catalysts are typically used in small amounts, for example, each catalyst being employed from about 0.0015 to about 5 or 0.1 to 0.5 parts by weight per 100 parts by weight of the quasi-prepolymer, if present at all. The catalyst may be omitted.

The foam-forming reaction mixture also may contain various liquid functional ingredients such as colorants, fungicides, insecticides, pigments, selective herbicides, and the like. If present, these preferably constitute up to 10% or up to 5% of the total weight of the reaction mixture.

Hydrophilic polyurethane foam is made by combining the ingredients to form a reaction mixture and subjecting the resulting reaction mixture to conditions at which the isocyanate-functional quasi-prepolymer and water (as well as other isocyanate-reactive components) react to form the polyurethane foam.

The proportions of ingredients are selected to provide an isocyanate index of 0.5 to 50. Isocyanate index is 100 times the ratio of isocyanate groups to isocyanate-reactive groups provided to the reaction mixture (prior to any reaction), with water being considered as having two isocyanate-reactive groups. The isocyanate index may be 0.5 to 25, 1 to 25, 2 to 20 or 2 to 15, for example.

The water index in the reaction mixture may be, for example, at least 200, at least 400, at least 500 or at least 650 and may be, for example, up to 20,000, up to 15,000, up to 12,000 or up to 10,000. Water index is 100 times the ratio of equivalents of water to the equivalents of isocyanate groups provided to the reaction mixture (prior to any reaction), with water again being considered as having two isocyanate-reactive groups.

The surfactant(s) are conveniently combined with the water before the water and quasi-prepolymer are combined to form the reaction mixture. Alternatively, the surfactant(s) can be combined with the other ingredients at the same time the water and quasi-prepolymer are combined. The surfactant(s) may be combined with a portion of the water before being combined with the remainder of the water and the quasi-prepolymer.

Curing occurs spontaneously upon mixing the water with the quasi-prepolymer, and so a broad range of conditions is suitable for performing the reaction. The curing temperature may be as low as 0° C. or as high as, for example, 100° C. Temperatures near room temperature or slightly elevated temperature are entirely suitable and generally preferred. Thus, the curing temperature may be at least 15° C. or at least 20° C. and up to 50° C., 40° C. or 35° C. The curing reaction produces carbon dioxide gas that forms cells and expands the reaction mixture as the curing takes place.

The curing step may be performed in an open container, in which the rising foam expands against the weight of the atmosphere and/or the weight of a thin film. Such a free-rise process may be performed by dispensing the reaction mixture into a trough where it rises and cures.

The curing step may instead be performed in a closed container such as a closed mold, in which expansion is constrained by the internal dimensions of the cavity to produce a foam having a size and shape corresponding to that of the mold cavity.

The curing step can be performed by dispensing the reaction mixture onto a belt or moving substrate, gauging it to a desired thickness and curing the gauged reaction mixture on the belt or on the substrate to form a mat or rollstock.

The hydrophilic polyurethane foam may alternatively be formed in place using foam-spraying methods in which the various ingredients of the reaction mixture are combined and the resulting reaction mixture sprayed onto a surface where the foam is wanted.

The amount of water in the reaction mixture is far in excess of the amount of isocyanate groups of the quasi-prepolymer. Because of this, the cured foam often contains a significant amount of moisture that may be at least partially in the form of a liquid contained in the cells of the foam. A drying step may be performed to remove some or all of this excess water.

Such a drying step can be performed, for example, by passing a dry gas through the foam, by allowing the foam to sit under a dry atmosphere, and/or by heating the foam to a temperature of, for example, 50 to 150° C. Drying can be performed until any desirable moisture content is achieved. In some embodiments, drying is performed until a constant foam weight is achieved, indicating the removal of residual water from the foam.

The hydrophilic polyurethane foam of the invention may have a foam density of, for example, 40 to 144 $kg/m^3$, as measured according to ASTM D3574. A significant advantage of this invention is that foam densities of 80 $kg/m^3$ and below are readily obtained. In some embodiments, the foam density is 48 to 80 $kg/m^3$ or 48 to 64 $kg/m^3$.

The hydrophilic polyurethane foam absorbs water. The foam preferably exhibits a water holding of at least 150 g water/2.54 cm thickness when measured on a 10.16 cm×10.16 cm×2.54 cm-thick foam sample. The foam may exhibit a water holding of at least 165 g water/2.54 cm thickness or at least 180 g water/2.54 cm thickness.

The foam preferably exhibits a swelling of at most 150%, preferably at most 125%, when saturated with water.

Water holding and swelling each are measured by drying a rectilinear foam sample (approximately 4 inch×4 inch×1 inch thick, (10.16 cm×10.16 cm×2.54 cm) at 100° C. until a constant weight is obtained (at least 15 hours), and measuring the dimensions and weight of the dried foam. The foam is then submerged in water for at least 12 hours at 22±3° C., removed and allowed to sit over a grate or drain for 2 hours at 22±3° C. to allow excess water to drain. The samples are then re-weighed and their dimensions re-measured. Swelling is calculated as the volume gained (volume of the wetted and drained sample minus the volume of the dried sample), divided by the volume of the dried sample.

Water holding is calculated as a function of sample thickness as:

$$\text{Water Holding (g/in)} = (\text{Weight}_{2\,hr,dry} - \text{Weight}_{dry}) \div \text{Thickness}_{2\,hr,dry}$$

wherein $\text{Weight}_{2\,hr,dry}$ is the weight of the sample after being submerged and drained for 2 hours, $\text{Weight}_{dry}$ is the weight of the dried sample before submersion, and $\text{Thickness}_{2\,hr,dry}$ is the thickness of the sample after being submerged and drained for 2 hours.

An advantage of the hydrophilic foam of the invention is its ability to retain absorbed water even when subjected to a compressive force. This characteristic is highly beneficial when the foam is used as a component of a water containment system, in which the foam bears the weight of one or more layers or other structures that are positioned above the foam. Preferably, the foam retains at least 90%, more preferably at least 95% of absorbed water when under an applied compressive force of 75 lb/ft² (3.591 kPa), when measured according to the water holding measurement method. The foam in some embodiments retains at least 75% of absorbed water when under an applied compressive force of 150 lb/ft² (7.182 kPa).

Water retention is measured in the same general manner as water holding. After weighing and measuring the submerged and drained sample, the sample is placed under successive loads for 3 minutes. After each loading is applied and removed, the weight of the foam is measured, with weight loss being attributed to the loss of water due to the compression of the foam. The water retention at any given compressive force is calculated as a percentage of the water weight of the submerged and drained foam, which in turn is equal to Weight$_{2\ hr,dry}$−Weight$_{dry}$.

Because of this ability to hold absorbed water even when under compressive force, the foam of the invention has particular benefit when used as a component of a water containment system. In such a water containment system, water entering the system is transferred by, for example, draining, pumping or otherwise, to the hydrophilic polyurethane foam component where it is absorbed and retained. The water is reversibly absorbed and can be removed from the hydrophilic foam component through various mechanisms such as under the force of gravity; wicking through other layers and/or components of the containment system; drying; and the like.

A water containment system of the invention may be, for example, a blue roof, a green roof, a blue-green roof, or a system for capturing and containing precipitation falling upon and/or running off of other structures such as parking lots, parking garages, tarmacs, roads, bridges and the like.

In particular embodiments the water containment system comprises the hydrophilic polyurethane foam of the invention in the form of one or more layers or bodies contained within the water containment system. If in the form of a layer, the hydrophilic polyurethane foam may have a thickness, for example, of at least 10 mm, at least 25 mm or at least 50 mm and, for example, up to 1 meter or more, up to 250 cm, up to 100 cm, up to 50 cm or up to 25 cm.

The water containment system may include at least one top surface layer positioned directly or indirectly on top of at least a portion of the hydrophilic polyurethane foam layer. The top surface layer, as in the case of outdoor structures such as a building, a parking lot, a garage, a roadway, etc., may be open to the atmosphere such that precipitation (rain, hail, sleet and snow, for example) falls onto it. The hydrophilic foam may directly or indirectly bear some or all of the weight of the top surface layer and/or any intermediate layers as may be present.

The composition and structure of the top surface layer will of course be selected in accordance with the function of the particular installation. The top surface layer may be, for example, a walkway or roadway. Such a walkway or roadway may be constructed of, for example, concrete, reinforced concrete, stone, ceramic tile, macadam, polymer concrete, steel, aluminum, other metal, wood or other suitable material.

The top surface layer may be a vegetation layer. Such a vegetation layer will include at least a soil layer, and may contain one or more containers for holding the soil as well as the vegetation itself (at least during the growing season). The soil layer and/or its container may reside directly atop the hydrophilic polyurethane foam. Alternatively, one or more additional layers or structures may reside between the top surface layer and the hydrophilic polyurethane foam layer. These may include various structural layers, such as supports for the top layer, or other structural or functional features.

The water containment system may comprise means for draining water falling upon the top surface layer to the hydrophilic foam layer. In some embodiments, such means includes pores or other openings in those layers, so that the water penetrates through the layer(s) to the hydrophilic polyurethane foam below. When the water containment system forms all or part of a green roof system, for example, water may drain from the top vegetation layer by percolating through the soil and soil container, if any, to the underlying hydrophilic foam layer. In other embodiments, such means may include drains or other openings, optionally coupled to one or more conduits, through which the water may flow down to the hydrophilic polyurethane foam.

The water containment system may further comprise at least one water barrier layer directly or indirectly underneath the hydrophilic polyurethane foam to capture water that permeates from the hydrophilic polyurethane foam and prevent it from permeating farther downward onto the underlying structure. In a green or blue roof, for example, this water barrier material may be, for example, the roof membrane itself or other barrier layer.

The FIGURE illustrates an embodiment of a water containment system of the invention. Water containment system 9 includes, generally, support structure 1; optional insulation/root barrier structure 2; water barrier layer 3; drainage layer 4; filter or separation fabric 5; growth medium layer 6 and vegetation layer 7. The hydrophilic polyurethane foam of the invention forms all or a portion of drainage layer 4.

Support structure 1 is a load-bearing layer that supports the overlying structures. It can be of concrete, reinforced concrete, wood, composite, organic polymer or other building material that is capable of bearing the superimposed weight. It may be, for example, a roof, a paved area, the ground or other structure that bears the weight of the other elements.

Optional insulation/root barrier structure 2, when present, serves to prevent water from passing downward to support structure 1 and/or to prevent roots from plants growing in vegetation layer 7 from penetrating to and into support structure 1. In the illustrative embodiment shown, insulation/root barrier structure 2 includes waterproof membrane 2A and board insulation layer 2B. Waterproof membrane 2A is generally a thermoplastic rubber such as thermoplastic olefin, ethylene-propylene-diene terpolymer or polyvinylchloride. Board insulation layer 2B may be, for example, a foamed rigid polymer board such as foamed polystyrene, foamed polyurethane, foamed polyisocyanurate and the like.

Water barrier layer 3 may be, for example, a waterproof membrane as described with respect to waterproof membrane 2A.

In the illustrative embodiment shown, drainage system 4 includes layer 4A of a geotextile, i.e., a semi-porous fabric whose function is to facilitate flow of water into one or more drainage means (not shown) through which water can be removed from the water containment system into a sewer or other system. The drainage means may include any drain or other conduit system through which water passing through drainage system 4 is removed from the water containment system. It may consists of drains, pipes, troughs or other fluid conduits, as well as associated flow management devices such as plugs, values, pumps, flow control systems and the like.

The geotextile may be, for example, an American Association of State Highway and Transportation Officials Class 1 or Class 2 geotextile. An example of a suitable geotextile is a polypropylene fabric weighing from 50 to 500 g/m$^2$ such as is available commercially as Optigreen Separation Fabric. Layer 4A is optional and its function can be performed by the hydrophilic polyurethane foam layer 4B. For example, hydrophilic polyurethane foam layer 4B can be produced with one or more channels on its bottom surface, which channels form pathways through which water can flow and be removed from the water containment system.

In the illustrative embodiment shown, drainage system 4 further includes porous fabric 4C and mechanical reservoir system 4D, each of which is optional and each of which can be replaced by hydrophilic foam layer 4B. Mechanical reservoir system 4D may be, for example, a dimpled sheet or fabric, in which water is collected in the dimples. Such a dimpled sheet is sometimes referred to as an "egg carton" structure, and may be engineered with openings through which excess water can flow to lower layers when the dimples have been filled.

Thus, drainage system 4 may consist solely of hydrophilic polyurethane foam layer 4B, or may comprise hydrophilic polyurethane foam 4B with any one or more of layers 4A, 4C and 4D, as well as other optional layers as may be desirable.

In the illustrative embodiment shown, layer 5 of water containment system 9 is a separation fabric that functions to prevent soil from washing down to lower layers while letting water pass. The separation fabric therefore is porous to water but has openings small enough to prevent soil from passing through. Separation fabric 5 may be a geotextile as described above, or other woven or non-woven fibrous material.

Layer 6 is a growth medium layer that includes organic matter and may include inorganic matter. Layer 6 preferably has moisture content at maximum holding capacity of at least 35% and a porosity at maximum water holding capacity of at least 6%, in each case as measured according to ASTM E2399.

The following examples are provided to illustrate the invention, but are not intended to limit the scope thereof. All parts and percentages are by weight unless otherwise indicated.

EXAMPLE 1 AND COMPARATIVE SAMPLES A-B

A. Quasi-Prepolymer Formation

Quasi-Prepolymer (QP) 1 is made from ingredients as indicated in Table 1. The ethylene oxide homopolymer (Polyol A) is melted and combined with Polyol B. The mixture is dried to a moisture content of less than 250 ppm. A trace of benzoyl chloride is added to the dried polyols and stirred in. The polyisocyanate(s) are separately heated to 50° C. and combined with the polyol(s). The resulting reaction mixture is heated at 75° C. under nitrogen until a constant isocyanate content is obtained. The quasi-prepolymer is then cooled to room temperature and stored under nitrogen.

QP-A and QP-B are made in the same general manner, from ingredients listed in Table 1. In the case of QP-A, both polyols are room temperature liquids and so are combined without the need to melt them.

The NCO content in each case is measured according to ASTM D5155. The oxyethylene content of the quasi-prepolymer is calculated from that of the starting materials. The 4,4'-content of the isocyanate(s) is calculated from those of the starting isocyanates. The resulting values are as reported in Table 1.

Polyol A is a 1000 molecular weight, nominally difunctional homopolymer of ethylene oxide. It contains 100% oxyethylene groups and is a room temperature solid. Polyol A is commercially available as Carbowax™ 1000 polyol from The Dow Chemical Company.

Polyol B is a copolymer of ethylene oxide and propylene oxide having a nominal hydroxyl functionality of 3 and a number average molecular weight of approximately 5,000 g/mole. It contains 75% oxyethylene groups. Polyol B is commercially available as VORANOL™ CP-1421 polyol from The Dow Chemical Company.

Polyol C is a copolymer of ethylene oxide and propylene oxide having a nominal hydroxyl functionality of 2 and a number average molecular weight of approximately 2,400 g/mole. It contains 64% oxyethylene groups. Polyol A is commercially available as UCON™ PCL-270 polyol from The Dow Chemical Company.

Polyol D is trimethylolpropane.

Isocyanate A is a mixture of 98% 4,4'-MDI and 2% 2,4'-MDI. It has an isocyanate content of 33.5%. Isocyanate A is available from The Dow Chemical Company as ISONATE™ 125M polyisocyanate.

Isocyanate B is a mixture of 50% 4,4'-MDI and 50% 2,4'-MDI. It has an isocyanate content of 33.5%. Isocyanate B is available from The Dow Chemical Company as ISONATE™ 50 O,P polyisocyanate.

Isocyanate C is a mixture of 80% 2,4-toluene diisocyanate and 20% 2,6-toluene diisocyanate.

TABLE 1

| | Parts by Weight | | |
|---|---|---|---|
| Ingredient | QP-1 | QP-A* | QP-B* |
| Polyol A | 52 | 58 | 7 |
| Polyol B | 13 | 4 | 62 |
| Polyol C | 0 | 0 | 0 |
| Polyol D | 0 | 0 | 0 |
| Isocyanate A | 21 | 0 | 18.6 |
| Isocyanate B | 14 | 0 | 12.4 |
| Isocyanate C | 0 | 38 | 0 |
| Properties | | | |
| NCO Content, % | 7% | 10% | 7% |
| 4,4'-MDI isomer content | 80% | N/A | 62% |
| Polyol average oxyethylene content | 95% | 100% | 66% |
| QP Oxyethylene content | 62% | 58% | 46% |

*Comparative.

B. Preparation of Hydrophilic Foam

Hydrophilic Foam Example 1 and Comparative Foams A-B are made from Quasi-Prepolymers 1 and A-B, respectively.

Surfactant A is a commercially available silicone foam-stabilizing surfactant.

Surfactant B is an ethylene oxide/propylene oxide block copolymer having a molecular weight of about 2500 and a nominal hydroxyl functionality of 2.

54.4 parts of water, 5 parts of Surfactant A and 1 part of Surfactant B are blended to form an aqueous phase. In each case, 39.7 parts of the quasi-prepolymer is combined with the aqueous phase at room temperature and mixed with a high-speed laboratory mixer for 10-20 seconds. The resulting reaction mixture is poured into an 11.2 cm×11.2 cm×2.54 cm open mold and allowed to rise freely. After the foaming is complete the foam is allowed to rest for 10 minutes. The crown is removed to produce an 11.2 cm×11.2 cm×2.54 cm foam body.

The foams are conditioned overnight at ambient temperature and humidity before performing property testing. Water holding, water retention and swelling are measured as described above.

Results of the testing are as indicated in Table 2.

TABLE 2

| Property | Ex. 1 | Comp. A* | Comp. B* |
|---|---|---|---|
| Water holding (no applied pressure, g/2.54 cm thickness | 194 | 123 | 228 |
| Water retention,%, under applied pressures as follow: | | | |
| 12.5 lb/ft$^2$ (0.599 kPa) | 99 | 85 | 99 |
| 50 lb/ft$^2$ (2.394 kPa) | 97 | 72 | 86 |
| 62.5 lb/ft$^2$ (2.993 kPa) | 96 | 68 | 78 |
| 75 lb/ft$^2$ (3.591 kPa) | 94 | 62 | 68 |
| 112.5 lb/ft$^2$ (5.387kPa) | 91 | 57 | 58 |
| 150 lb/ft$^2$ (7.182 kPa) | 81 | 50 | 46 |
| Total Swelling, % | 112 | 81 | 159 |

*Comparative

As the data in Table 2 demonstrates, the example of the invention exhibits far superior water retention.

What is claimed is:

1. A water containment system comprising a hydrophilic polyurethane foam which is the reaction product of a reaction mixture that comprises:
   a) water,
   b) a quasi-prepolymer, which quasi-prepolymer has an isocyanate content of 5 to 15% by weight and contains 55 to 75 weight percent of oxyethylene units based on the weight of the quasi-prepolymer, which quasi-prepolymer is a reaction product of 1) a hydroxyl-terminated polymer of ethylene oxide or mixture of two or more thereof, wherein the hydroxyl-terminated polymer of ethylene oxide or mixture thereof has an average oxyethylene content of at least 90 weight percent, based on the weight of the hydroxyl-terminated polymer of ethylene oxide or mixture thereof, has a number average nominal hydroxyl functionality of 2 to 2.5 and has a number average hydroxyl equivalent weight of at least 350, with ii) an excess of an organic polyisocyanate that includes at least 80 weight percent diphenylmethane diisocyanate of which diphenylmethane diisocyanate at least 60 weight percent is 4,4'-diphenylmethane diisocyanate, wherein component b) is present in an amount sufficient to provide an isocyanate index of 0.5 to 50; and
   c) one or more surfactants.

2. The water containment system of claim 1 wherein the hydroxyl-terminated polymer of ethylene oxide or mixture of two or more thereof includes at least one ethylene oxide homopolymer.

3. The water containment system of claim 2 wherein the hydroxyl-terminated polymer of ethylene oxide or mixture of two of more thereof further includes at least one random or block copolymer of ethylene oxide and 1,2-propylene oxide which contains 50 to 95 weight percent of oxyethylene groups and correspondingly 5 to 50 weight percent of oxypropylene groups.

4. A water containment system comprising at least one water barrier layer, at least one layer of a hydrophilic polyurethane foam directly or indirectly on top of at least a portion of the at least one water barrier layer, and at least one top surface layer positioned directly or indirectly on top of at least a portion of the at least one layer of hydrophilic polyurethane foam, the water containment system comprising drainage means for draining water falling upon the at least one top surface layer to the at least one layer of hydrophilic polyurethane foam, wherein the at least one layer of hydrophilic polyurethane foam is the reaction product of a reaction mixture that comprises:
   a) water,
   b) a quasi-prepolymer, which quasi-prepolymer has an isocyanate content of 5 to 15% by weight and contains 55 to 75 weight percent of oxyethylene units based on the weight of the quasi-prepolymer, which quasi-prepolymer is a reaction product of 1) a hydroxyl-terminated polymer of ethylene oxide or mixture of two or more thereof, wherein the hydroxyl-terminated polymer of ethylene oxide or mixture thereof has an average oxyethylene content of at least 90 weight percent, based on the weight of the hydroxyl-terminated polymer of ethylene oxide or mixture thereof, has a number average nominal hydroxyl functionality of 2 to 2.5 and has a number average hydroxyl equivalent weight of at least 350, with ii) an excess of an organic polyisocyanate that includes at least 80 weight percent diphenylmethane diisocyanate of which diphenylmethane diisocyanate at least 60 weight percent is 4,4'-diphenylmethane diisocyanate, wherein component b) is present in an amount sufficient to provide an isocyanate index of 0.5 to 50; and
   c) one or more surfactants.

5. The water containment system of claim 4 wherein the at least one top surface layer includes soil and vegetation layers and the drainage means include pores in the soil layer in fluid communication with the at least one layer of hydrophilic polyurethane foam.

6. The water containment system of claim 5 wherein the at least one layer of hydrophilic polyurethane foam has one or more channels on a bottom surface, which one or more channels form pathways through which water can flow and be removed from the water containment system.

7. The water containment system of claim 5, further comprising a roof structure directly or indirectly below the at least one water barrier layer.

8. The water containment system of claim 4 wherein the hydroxyl-terminated polymer of ethylene oxide or mixture of two or more thereof includes at least one ethylene oxide homopolymer.

9. The water containment system of claim 4 wherein the hydroxyl-terminated polymer of ethylene oxide or mixture of two or more thereof includes at least one random or block copolymer of ethylene oxide and 1,2-propylene oxide which contains 50 to 95 weight percent of oxyethylene groups and correspondingly 5 to 50 weight percent of oxypropylene groups.

10. The water containment system of claim 4 further comprising an insulation/root barrier structure comprising a waterproof membrane and a board insulation layer.

11. The water containment system of claim 4 wherein the at least one layer of hydrophilic polyurethane foam forms part of a drainage system which further includes a geotextile, a porous fabric and a mechanical reservoir system.

* * * * *